United States Patent [19]

Sales

[11] 4,112,551
[45] Sep. 12, 1978

[54] DRAW STRINGS PULLER AND FASTENER

[76] Inventor: Buenaventura Z. Sales, 5234 Westmont Ave., San Jose, Calif. 95130

[21] Appl. No.: 771,622

[22] Filed: Feb. 24, 1977

[51] Int. Cl.² .................. F16G 11/14; F16G 11/10
[52] U.S. Cl. .................................. 24/117; 24/266; 24/136 L; 403/211
[58] Field of Search ............ 24/266, 115 H, 117, 24/136 L; 403/211

[56] References Cited

U.S. PATENT DOCUMENTS

| 515,155 | 2/1894 | Nelson | 24/136 L |
| 3,845,575 | 11/1974 | Boden | 24/117 R |
| 3,965,544 | 6/1976 | Boden | 403/211 |

FOREIGN PATENT DOCUMENTS

| 59,008 | 5/1913 | Austria | 24/136 L |
| A80,351 | 3/1963 | France | 24/117 R |
| 723,716 | 8/1942 | Fed. Rep. of Germany | 403/211 |
| 1,171,802 | 6/1964 | Fed. Rep. of Germany | 403/211 |
| 572,449 | 1/1958 | Italy | 24/117 R |
| 34,651 | 3/1910 | Sweden | 24/136 L |

*Primary Examiner*—Bernard A. Gelak
*Attorney, Agent, or Firm*—Leslie M. Hansen

[57] ABSTRACT

For a draw string in which the looped mid portion operatively associated with a closable member has its ends slidably passing into one closed end and out of an open end of a thimble-like slide fastener, the closed end of which is adapted to abut the closable member while the ends of the cord are pulled, and a knob on the terminal ends of the cord having a tapered end insertable into the open end of the slide fastener for securing the portions of the pull cord therein and the looped mid portion of the cord in closed condition relative to the closable member.

5 Claims, 9 Drawing Figures

U.S. Patent      Sept. 12, 1978      4,112,551
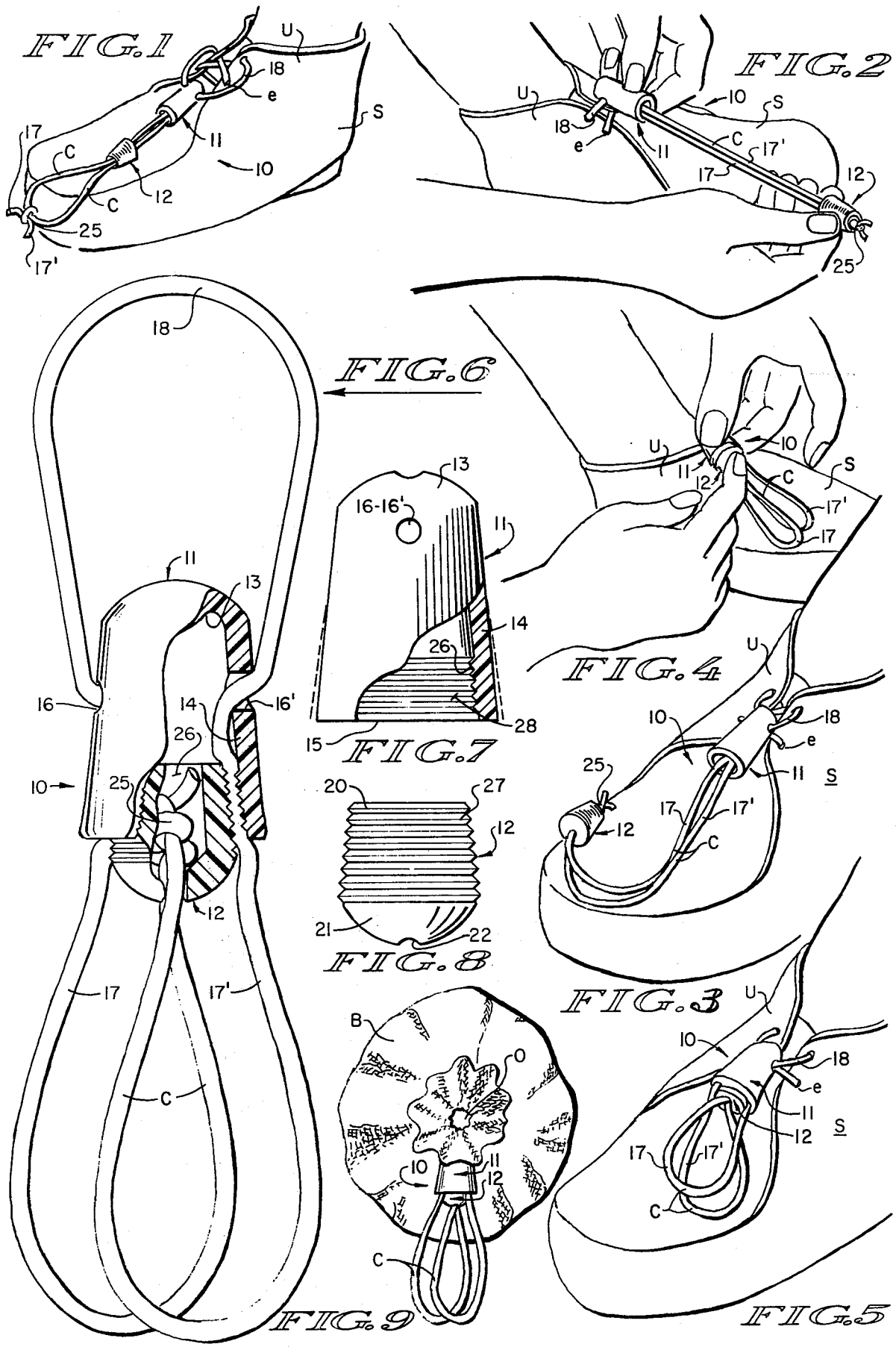

DRAW STRINGS PULLER AND FASTENER

BACKGROUND

This invention relates to a fastener for a looped cord and more particularly to a snap tie for fastening or securing a lacing or draw string in tightened condition.

The best illustration of a draw string or cord may be found in the string by which the over arch upper of a shoe for a human foot is laced through eyelets in such upper to be drawn tightly upon a person's foot and the free ends of the shoe string tied into a bow to secure the shoe upon the person's foot.

Another illustration of a looped draw string would be a cord strung through the hem at the open end of a bag or pouch to be drawn tightly to close the open end of such bag or pouch and the free ends of such cord tied into a knot or bow to secure the closure of such bag or pouch.

There is hardly a person who has not experienced the loosening of one's shoelace or the opening of the bow therein, leaving the free ends of the lacing to flap about, become stepped on, and cause a misstep, stumble, or fall. Many times the free ends of such lacing may become knotted, rendering it difficult to untie one's shoelaces, usually at a most inopportune moment or location. The present invention seeks to overcome such accidental knotting, unlacing, loosening, and/or the danger of the free ends of the lacing being stepped upon.

STATEMENT OF THE INVENTION

It is an object of the present invention to provide a simple yet effective means for fastening a looped cord or lace relative to a closure structure about which the cord is strung or interlaced.

It is a further object of this invention to provide a positive, releasable fastening means for the free ends of a looped lacing strung through the eyelets of a shoe upper and the like for securing the lacing in locked condition relative to the latter. In this connection the invention resides in a snap fastener having a cup-shaped portion through which the free ends of the looped lacing is strung, and a plug element in which the free ends of the looped lacing are anchored, the plug element being adapted to be press fit into the cup-shaped portion of the fastener for cinching the strands of the looped lacing in locked condition relative thereto.

These and other objects and advantages of the present invention will become apparent from the following description and claims in the light of the accompanying single sheet of drawing in which:

FIG. 1 is a perspective view showing the loop of a shoe lace on a shoe upper upon which the fastener of the present invention is applied;

FIG. 2 is a view similar to FIG. 1 showing the knotted ends of the lace loop being drawn tight upon the shoe upper by the fastener cap;

FIG. 3 shows the lace tightened upon the shoe upper and the knotted ends of the lace anchored in a plug and turned toward the fastener cap;

FIG. 4 shows the plug being inserted into the fastener cap;

FIG. 5 shows the looped lace tight and the plug and cap united to secure the lace in a tightened condition on the shoe upper;

FIG. 6 is an enlarged detail, partly in section to illustrate the loop fastener of the present invention;

FIG. 7 is a elevation of the cap only of FIG. 6 and partially broken away for the purpose of illustration;

FIG. 8 is an elevation of the plug only of FIG. 6; and

FIG. 9 is a plan view of a sack or bag having the looped strand in a hem at the open end of the sack and drawn tightly thereabout and secured by the fastener of the present invention.

GENERAL DESCRIPTION

Referring to the drawing, FIGS. 1 through 5 inclusive show a shoe S for a human foot having a shoe string or cord C laced through the eyelets -e- of the shoe upper U. In these views the snap fastener embodiment of the present invention is designated by reference numeral 10.

DETAILED DESCRIPTION

The snap fastener 10 of the present invention is best illustrated in FIGS. 6, 7 and 8 as consisting of two main parts; namely, a cup-shaped member 11 and a plug element 12.

The cup-shaped cap member 11 is preferably bell shaped or thimble-like in form having a closed top 13 from which a gradually expanding cylindrical side wall 14 extends toward an open bottom 15.

The cap shaped member 11 has a pair of apertures 16–16' formed through its upper zone to receive the respective ends 17 and 17' of a cord C leaving a looped mid portion 18 thereof extending beyond the closed top 13 of the member 11. It is this looped mid portion 18 of a shoe string that is laced through the eyelets -e- of the shoe upper as illustrated in FIGS. 1 through 5 of the drawing.

The free ends 17–17' of the cord C pass through the cap member 11 and extend out of the open bottom 15 thereof.

The plug element 12 of the fastener 10 comprises a tapered annular portion 20 extending from an end 21, which is substantially closed except for an aperture 22 through which the extreme ends of the free ends 17–17' of the cord C are adapted to be passed. The extreme ends of the cord C are tied into a knot 25 so that the plug 12 serves as a knob by which the ends 17–17' of the cord can be pulled away from the cap member 11 to thus close the looped mid portion 18 into a small loop adjacent the cap. The plug element 12 has an internal cavity 28 for receiving and housing the terminal knot 25 on the ends 17–17' of the cord C and to assure that they remain tied when the cord is pulled.

For purposes of the wide application and uses of the fastener 10, I have shown a bag or pouch B in FIG. 9 having a conventional hem (not shown) in the open end -O- thereof through which the looped mid portion 18 of the cord C as shown in FIG. 6 is strung as a draw string.

At all events, the looped mid portion 18 is adapted to be drawn tightly by pulling the cord ends 17–17' outwardly of the open end 15 of the cup-shaped cap 11, while the latter is firmly pressed into abutment against the hem or shoe upper through which the cord C is strung to keep the loop tightened. This step is best illustrated in FIG. 2.

With the cap 11 snuggly abutting against the bag or upper shoe last, the plug element is turned to face its tapered portion 20 toward the bell shaped open end 15 of the cap (FIG. 3). The tapered end 20 is ultimately inserted into the cap 11 and pressed in place therein as shown in FIG. 4.

It should here be noted that the internal surface of the cylindrical wall 14 of the cap 11 is flexible such as to yield to the pressure of the tapered end 20 of the plug element 12 (see dotted lines, FIG. 7).

By the foregoing arrangement, those portions of the ends 17-17' of the cord C within the cap 11 are squeezed tightly between the tapered portion 20 of the plug 12 and the inner face of the yieldable wall 14 of the cap 11. In this manner the plug 12 serves as a retainer for holding the cord engaged thereby firmly against the cylindrical wall 14.

To assure a non-slip fit between the tapered portion 20 of the plug 12 and the internal surfaces of the wall 14 of the cap 11, a plurality of interlocking ridges are provided on these two main parts 11 and 12 of the snap fastener 10. These ridges, as best illustrated in FIGS. 7 and 8 are V-shaped as at 26 on the wall 14 adjacent the open end 15 thereof and at 27 on the tapered portion 20 of the plug 12.

The foregoing arrangement has many advantages over the ordinary manner of tying a shoe lace or fastening a closure on a bag or pouch. Among these advantages:

1. It provides a quick and simple fastener, especially for a child or handicapped person to secure a lace;
2. It prevents accidental knots on shoe string;
3. It prevents string from coming off a hook type eyelet and eliminates re-lacing;
4. It is safe because the string can be cut to an appropriate length to prevent tripping due to excessive length of the string.
5. It provides a positive lock when the retainer plug is pushed in firmly and wedged into the cap; the interlocking ridges prevent slipping of the cord; and
6. The appearance and arrangement is neat and decorative.

Having thus described my snap fastener for looped cord in specific detail, it will be appreciated that the same may be modified, varied or altered without departing from the spirit or scope of my invention as called for in the appended claims.

What I claim as new and desire to protect by Letters Patent is:

1. A draw string puller and fastener for a draw string engaging a hem, eyelets, hooks, and the like of a closable member comprising in combination:
   1. a cord having a mid portion interlacingly circumscribing such closable member;
   2. a cap member having a bell like body with a closed end from which a resilient flared cylindrical wall extends toward an open end;
   3. a pair of apertures formed through the closed end of said cap member through which the free ends of said cord slidingly pass and extend for opening and closing the looped mid portion thereof relative to said closable member;
   4. a plug element having a closed end from which a tapered opposite end extends, a bore formed through said plug element for passage of the terminal ends of said cord therethrough, and a cavity formed in the tapered opposite end of said plug element;
   5. a knot formed on the terminal ends of said cord for tying them together beyond said plug element for manually pulling the extended ends of said cord away from the cap member as it is held in abutting relation relative to the closable member for closing the looped mid portion of the cord upon the latter; and
   6. said tapered opposite end of said plug element conforming to the internal surface of said resilient flared cylindrical wall of said cap member and adapted for pressed fit into the open end of said cap member to thereby retain the free ends of said looped cord in juxtaposition therebetween and the looped mid portion of said cord in closed condition relative to said closable member.

2. The draw string puller and fastener in accordance with claim 1 in which said plug element has a recess formed in and opening onto it opposite end for receiving and housing the knot formed on the terminal ends of said cord.

3. The draw string puller and fastener in accordance with that of claim 2 in which the resilient flared cylindrical wall of said cap member has a plurality of annular grooves formed on its internal surface engageable by the tapered portion of said plug.

4. The draw string puller and fastener in accordance with that of claim 3 in which the internal surface of the tapered portion of said plug has a plurality of annular ridges formed thereon for interlocking relation with the annular grooves on the internal surface of said resilient flared cylindrical wall of the cap member.

5. The draw string puller and fastener in accordance with that of claim 4 in which said closable member includes two abutting sides of a shoe upper having the looped mid portion of said cord interlockingly attached to said shoe upper for drawing the latter tightly together upon manually pulling said plug element and the free ends of said cord from the cap member as it is held against the shoe upper.

* * * * *